Aug. 15, 1961  R. W. HENNING  2,995,753
EJECTOR FOR FASTENER DRIVING TOOL
Filed April 22, 1957  4 Sheets-Sheet 1

INVENTOR.
Robert W. Henning
BY
Hyde, Meyer, Baldwin & Doran
Attorneys

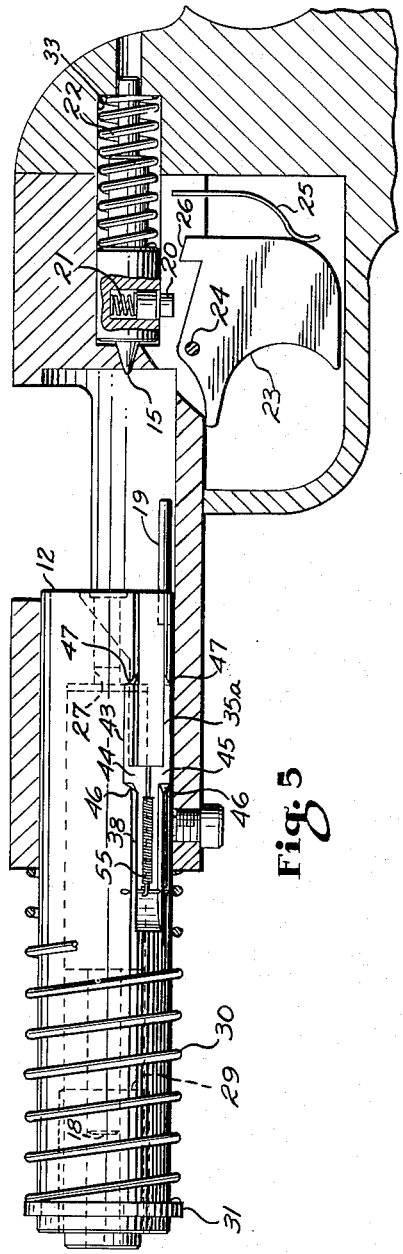
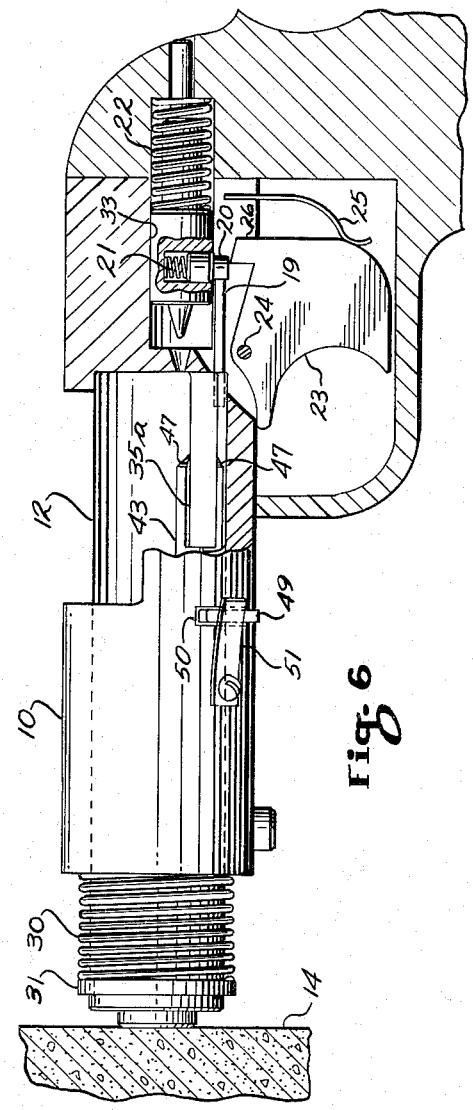
Fig. 5
Fig. 6
INVENTOR.
Robert W. Henning
BY
Hyde, Meyer, Baldwin & Doran
Attorneys

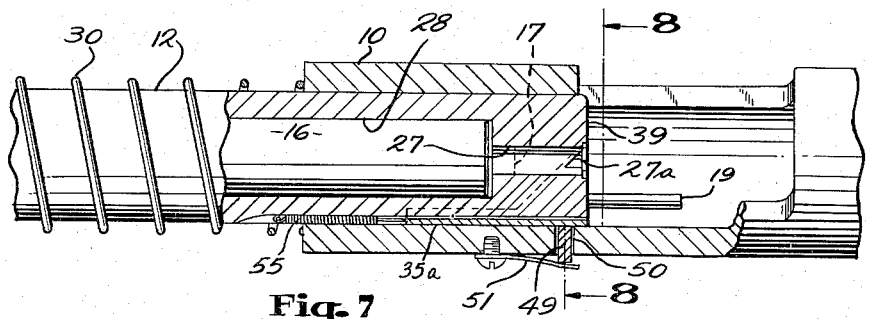
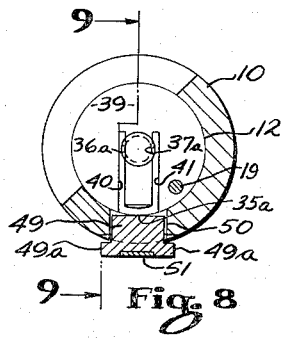 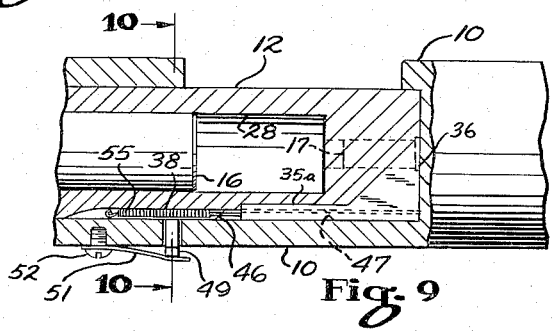
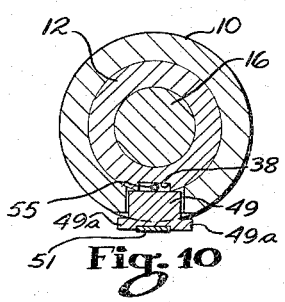 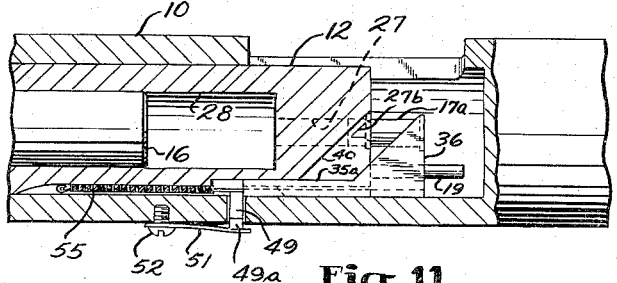
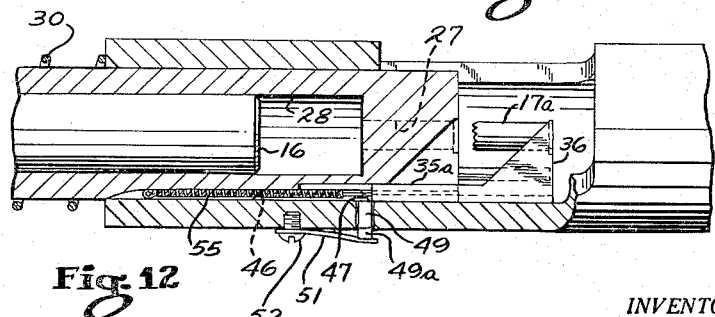
INVENTOR.
Robert W. Henning
BY
Hyde, Meyer, Baldwin & Doran
Attorneys Aug. 15, 1961 R. W. HENNING 2,995,753
EJECTOR FOR FASTENER DRIVING TOOL
Filed April 22, 1957 4 Sheets-Sheet 4

INVENTOR.
Robert W. Henning
BY
Hyde, Meyer, Baldwin & Doran
Attorneys

United States Patent Office 2,995,753
Patented Aug. 15, 1961

2,995,753
EJECTOR FOR FASTENER DRIVING TOOL
Robert W. Henning, Fairview Park, Ohio, assignor to Olin Mathieson Chemical Corporation, Cleveland, Ohio, a corporation of Virginia
Filed Apr. 22, 1957, Ser. No. 654,257
11 Claims. (Cl. 1—44.5)

This invention relates to power tools for driving fasteners into steel, concrete and the like, and more particularly, to novel extractor means for safely removing the cartridge case, which supplies the explosive charge for actuating the power tool, after the charge has been exploded.

An object of the present invention is to provide a power tool employing an explosive charge, with improved extractor means for automatically extracting a spent cartridge case from the tool.

A further object of the present invention is to provide a power tool employing an explosive charge, with novel extractor means for automatically extracting a spent cartridge case, from the breech of the tool, in response to the automatic or manual return of the breech and its associated barrel upon withdrawal of the tool from the work.

Still another object of the present invention is to provide a power tool employing an explosive charge with novel extractor means, said extractor means having parts thereof positioned between the igniter cap or rim of the cartridge and the breech of the tool, whereby said extractor automatically extracts the spent cartridge case from the breech end of the barrel and returns to its initial cartridge confining position adjacent the breech end of said barrel in advance of a new cartridge being placed in the breech and in repsonse to the automatic actuation of the breech and barrel upon withdrawal of the tool from the work.

Still another object of the present invention is to provide a powder actuated tool having a cartridge case extractor operatively mounted for longitudinal movement with respect to the barrel of said powder tool, said extractor having parts between the breech of the powder tool and the cartridge case head shoulder, said parts engaging said cartridge case in at least two points, whereby the spent cartridge case will be supported during extraction from the breech of the power tool in substantially axial alignment with a cartridge chamber in said breech to a point wherein said spent cartridge case completely clears said breech, and said extractor having other parts which become actuated upon said cartridge case clearing said breech which engage and pivot said spent cartridge case out of axial alignment with said barrel, and further, if desired, may cause the ejection of the cartridge case from the tool.

Still another object of the present invention is to provide a powder actuated tool having a cartridge case extractor operatively mounted for longitudinal movement with respect to the barrel of said power tool and adapted to engage said cartridge case prior to explosion thereof for resisting lateral blow-out in a breech-closed position and/or for resisting lateral movement of the spent cartridge case during tool movement toward the breech open position so that the extractor will properly extract the cartridge case.

Another object of the present invention is to provide a power tool having novel cartridge case extractor means characterized by its structural simplicity, the ease of assembly of its parts, its strong and sturdy nature and its low manufacturing cost. Other features of this invention reside in the arrangement and design of the parts for carrying out their appropriate functions.

Further objects of the present invention and certain practical advantages will be referred to in or will be evident from the following description of two embodiments of the invention, as illustrated in the accompanying drawings, in which:

FIG. 5 is a longitudinal view of the tool in the breech-open position withdrawn from the workpiece having some parts thereof shown in section to more clearly show the construction and position of the novel extractor means with the tool in this position;

FIG. 6 is a longitudinal view of the tool held against a workpiece in driving position with breech closed, firing pin cocked, and having parts thereof broken away to more clearly show the position of the extractor means.

FIG. 7 is a fragmentary sectional view taken along the plane of line 7—7 of FIG. 4 of the breech portion of the tool in a breech-open position withdrawn from the workpiece with a loaded cartridge in the breech;

FIG. 8 is a transverse sectional view taken along the plane of line 8—8 of FIG. 7 and showing the relative position of the extractor means;

FIG. 9 is a fragmentary sectional view taken along the plane of line 9—9 of FIG. 8 of the breech portion shown in closed position with the tool in its driving position, the firing pin released, the powder charge exploded, and the ram driven to its forward position;

FIG. 10 is a transverse sectional view taken along the plane of line 10—10 of FIG. 9 and showing the relative position of the extractor actuator with its surrounding parts;

FIG. 11 is a fragmentary sectional view of the breech portion of the tool with the breech partially open as a result of the tool being withdrawn from the workpiece and showing the extractor in the process of extracting the spent cartridge case from the breech of the tool;

FIG. 12 is a fragmentary sectional view similar to FIG. 11 but sequential thereto and showing the breech opened to even a greater extent than that shown in FIG. 11 with the spent cartridge shell completely extracted from the breech by the extractor;

Figure 1:
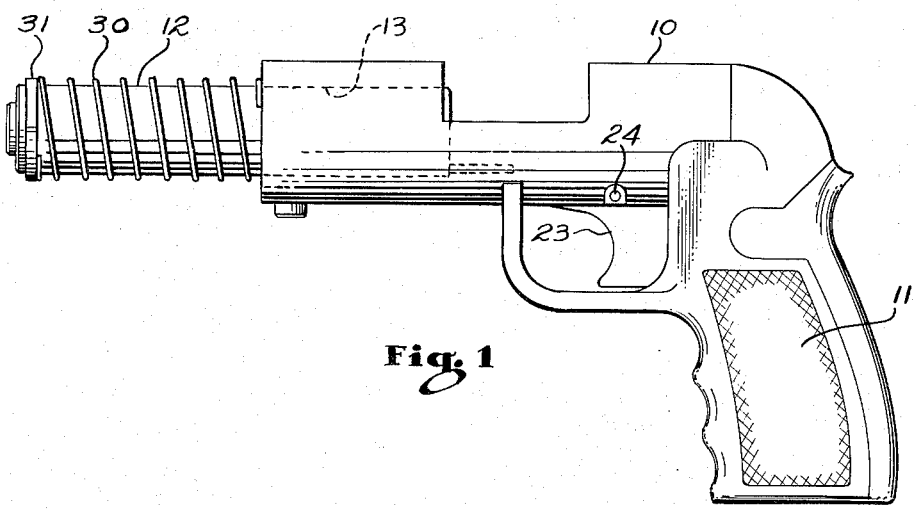
FIG. 1 is a side elevational view of the power tool forming the present invention with the tool in the breech-open position, withdrawn from the workpiece.
Figure 2:
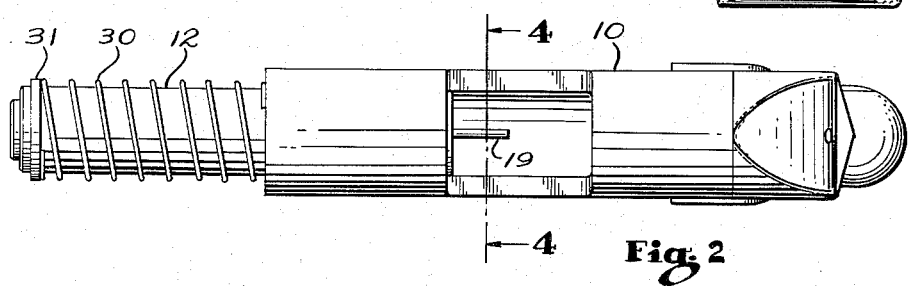
FIG. 2 is a top plan view of the tool in FIG. 1.
Figure 3:
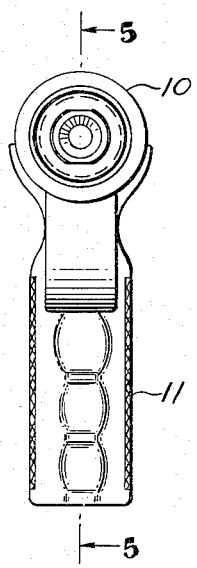
FIG. 3 is an end elevation view of the tool showing the muzzle end thereof, as viewed from the left of FIG. 1.
Figure 4:
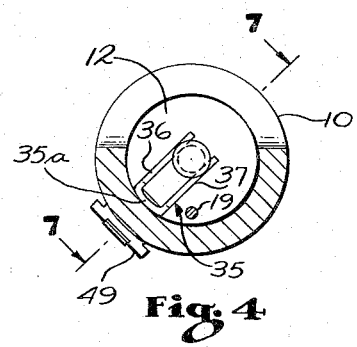
FIG. 4 is a transverse sectional view taken along the plane of line 4—4 of FIG. 2.
Figure 13:
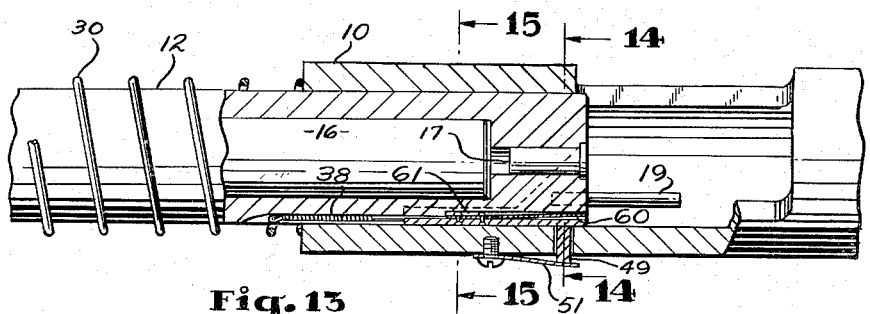
Figure 14:
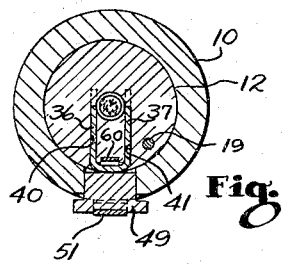
Figure 15:
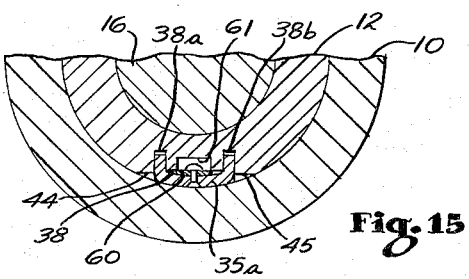

FIG. 13 is a fragmentary sectional view of another embodiment of the invention which includes a spring for engaging the spent cartridge and pivoting it out of axial alignment with the barrel of the tool, similar to FIG. 12 but sequential thereto and showing the breech portion of the tool with the breech fully open, the ram returned to its initial position, the shell extractor in its initial position and a new cartridge in the breech;

FIG. 14 is a transverse sectional view taken along the plane of line 14—14 of FIG. 13;

FIG. 15 is an enlarged fragmentary sectional view taken along the plane of line 15—15 of FIG. 13.

Figure 16:
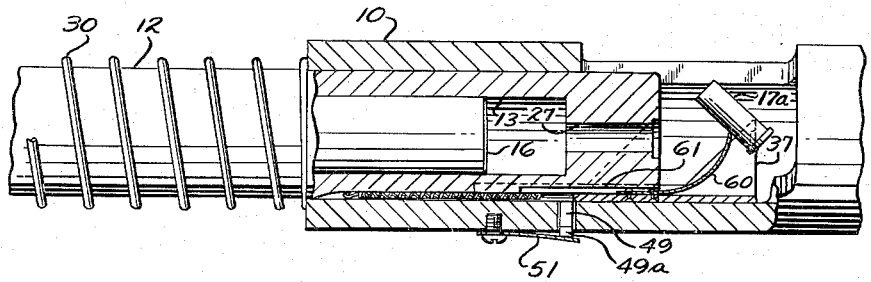
Figure 17:
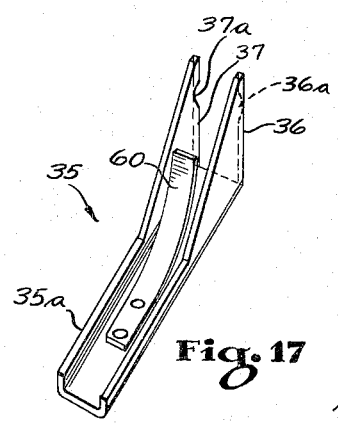

FIG. 16 is a fragmentary sectional view of the embodiment of the tool shown in FIG. 13 with the tool being withdrawn from the workpiece after the tool has been fired with the breech partially open and showing the spent cartridge case as fully extracted from the breech and being engaged by the novel spring means for pivoting the cartridge case out of axial alignment with the barrel of the tool; and FIG. 17 is an enlarged perspective view of the novel extractor device as employed in the embodiment of the invention disclosed as shown in FIGS. 13 through 16.

Before describing in detail the herein disclosed embodiments of the invention, it is to be understood that the present invention is not limited to the structural details or the particular arrangement of parts herein shown, as devices embodying the present invention may take other forms. It also is to be understood that the phraseology and terminology herein used are for purposes of description and not of limitation, as the scope of the present invention is denoted by the appended claims.

Those familiar with the present art will recognize that the instant invention may be applied in many ways, but it has been chosen to illustrate the same in conjunction with a powder-actuated tool.

Since both embodiments of the invention have the same basic parts and the same general mode of operation, a general description for those of FIGS. 1 to 12 inclusive will serve for both embodiments of the invention. The basic parts of the tool include a housing member or breech closure member 10 having a handle 11 at one end for engagement by the hand of the operator and a sleeve type ram guide member or barrel member 12 for guiding ram travel relative thereto between initial and final positions, and means operatively connecting said housing member 10 and said ram guide member 12 for axial relative movement, said means including a housing bore 13 in housing 10 and adapted to telescopically receive guide member 12. The basic purpose of the invention is to provide a power tool which actuates its ram by exploding the powder in a cartridge case for either driving a fastener into a workpiece 14 or for punching a hole in the workpiece, with novel extractor means for extracting the spent cartridge case from the breech after discharge thereof.

In order to facilitate a clear understanding of the invention, a brief description of the general mode of operation will follow. When the tool is free of a workpiece 14 it is said to be in a tool withdrawn or breech open position and has its component parts disposed as shown in FIGS. 1, 2, 5 and 7. The tool is then advanced toward the workpiece 14 until contact is made between the workpiece and the muzzle of the tool. Upon such contact the housing member 10 continues its downward movement until the breech closed or tool driving position of FIG. 6 is reached. The downward movement of the housing member with respect to the ram guide member 12 has the effect of cocking the firing pin 15, as shown in FIG. 6. From the position, as shown in FIG. 6, the trigger is pulled to release the firing pin 15 so that the ram 16 is driven downwardly by the exploding powder in loaded cartridge case 17 with the rod 18 at the end of ram 16 driving a suitable fastener or acting as a punch during this driving action. The tool is then pulled upwardly away from the workpiece 14 by movement in the opposite direction and returned to a withdrawn or breech open position, as shown in FIG. 5. The relative movement of the various members from the position shown in FIG. 6 to that shown in FIG. 5 is shown sequentially in FIGS. 7 through 12. During this relative axial movement the extractor is effective in extracting the spent cartridge case 17a from the breech of the tool.

Since a general introduction to both embodiments of the invention has been given, the form in FIGS. 1 to 12 inclusive will now be described in detail.

The tool includes power means for driving the ram 16 from an initial position to a final position. In the present disclosure, the power means takes the form of the powder containing cartridge case 17 and a firing pin assembly for igniting this powder by striking the primer in said cartridge case. The firing pin 15, as seen in FIGS. 5 and 6, is telescopically mounted within the housing bore 33 for longitudinal movement for striking the cartridge case primer and exploding the powder therein. The firing pin is cocked when the tool is moved in a downward direction against the workpiece from the breech open position, shown in FIG. 5, to the breech closed position of FIG. 6. A cocking rod 19 is rigidly carried by the ram guide member 12 at the breech end thereof and is locked therein by press fitting, welding or other suitable means. As the housing member 10 telescopes downwardly over the ram guide member 12, the upper end of cocking rod 19 engages firing pin pawl 20. The firing pin pawl 20 is normally biased outwardly by firing pin pawl spring 21 so that continued downward movement of tool housing member 10 will cause rod 19 to cock the firing pin 15 against its firing pin spring 22 to the fully cocked position of FIG. 6. A trigger 23 is pivotally connected to the housing member 10 at pivot 24 and when pulled will revolve counterclockwise about the pivot against the force of the trigger spring 25, anchored at its left end to the housing member 10, so that a trigger sear 26 will depress the pawl 20, with which it is aligned, and release firing pin 15. The firing pin spring 22 will drive the firing pin 15 downwardly against the primer of the cartridge case 17 to explode the powder charge therein.

It will be understood that the end of the guide member 12 adjacent the workpiece 14 will be referred to as the muzzle end while the other end of the guide member will be referred to as the breech end thereof. Means are provided in the breech end of the guide member 12 for supporting the cartridge case 17. Said means takes the form of a cartridge chamber 27 which consists of a bore in the breech end of the guide member 12 and is adapted to convey the exploding gases forwardly from the cartridge chamber 27 into the bore 28 of the ram guide or barrel member 12. The force of the explosion causes the ram 16 to be moved forwardly until it rests against the abutment sleeve 29, shown in FIG. 5.

Ram return means may be provided for automatically returning the ram from its final position (abutting abutment sleeve 29) back to its initial position shown in dotted lines in FIG. 5. The specific details of this return means is not presently shown but may be constructed in accordance with those shown in my copending application Serial No. 590,274, filed June 8, 1956. The ram is automatically returned in response to relative movement between the housing member 10 and the ram guide member 12 when the tool is moved from the driving position of FIG. 6 to the withdrawn position having the parts disposed as shown in FIG. 5. The tool also includes a muzzle spring 30 of the compression type to serve as a resilient means for biasing guide member 12 relative to the housing member 10 in the direction of fastener drive since the spring 30, as seen in FIGS. 1, 2, 5 and 6, is located between the muzzle end of the housing member 10 and a snap ring 31 mounted in a groove on the muzzle end of the guide member 12. As the tool is withdrawn from the workpiece, the component parts move from the position shown in FIG. 6 to the position shown in FIG. 5, as a result of the biasing action of muzzle spring 30.

The tool is provided with a cartridge case extractor 35 having a pair of spaced upstanding arms 36 and 37 at one end for cartridge case and cartridge case head shoulder engagement. The extractor is preferably placed on either side of the lower half of the tool at an angle of approximately 45° from the bottom thereof. The extractor is operatively connected between the housing member 10 and the ram guide member 12 for longitudinal movement thereon. The arm portions 36 and 37 thereof, engage the cartridge case in at least two points and in addition thereto engage the case head shoulder in such a manner that the extractor will extract the cartridge case in axial alignment with the guide member 12 and cartridge chamber 27. Means are provided for mounting the extractor on the guide member 12 adjacent the breech end thereof. Said means take the form of an elongated groove 38 provided in the side wall of the guide member 12 adjacent its breech end. The groove 38 extends axially or longitudinally of the guide member 12 and intersects the breech face 39 at one end thereof. The groove 38 adjacent its breech end may be U-shape in form or substantially the same as shown in FIG. 15 of the second embodiment of the invention and having spaced inwardly extending slots 38a and 38b which accommodate the channel shaped body portion of the extractor which will be hereinafter described. A pair of spaced slots 40 and 41 which are here shown as triangular in shape extend inwardly from the groove 38 and tangentially intersect and communicate with the cartridge chamber 27 on opposite sides thereof at 27a and 27b, as seen in FIGS. 7 and 11, respectively, and further intersect the breech face 39, as seen in FIGS. 8 and 11. A second groove 43 extends transversely across the groove 38 so as to provide the groove 38 with widened shoulder portions 44 and 45. The sloped shoulders 46 and 47 provided at the intersection of grooves 38 and 43 are slanted in opposite directions to one another, as seen in FIG. 5, for a camming purpose as will hereinafter be described. The extractor 35 is constructed with a main body portion 35a which may be channel shaped, as shown in FIG. 17, whose width is sufficiently narrower than the groove 38 in which it fits, so as to be reciprocable in said groove in a direction substantially longitudinally of the guide member 12. The portion 35a of the extractor fits entirely within the groove 38 and is snugly contained between the guide member 12 and the housing 10, as seen in FIGS. 8, 9, 11 and 12. The spaced upstanding arms 36 and 37 of the extractor are adapted to fit snugly but capable of easy movement within the grooves 40 and 41, respectively, and engage the cartridge tangentially on opposite sides of its cylindrical casing adjacent the case head shoulder or rim. Means is provided to normally urge the extractor into its non-extracting or closed position, as seen in FIGS. 5 and 7. Said means here takes the form of a coil spring 55 contained in its entirety within the groove 38 and secured at one end to the guide member 12 and at its other end to the extractor. It will be noted in FIGS. 8 and 17 that the edges of the upstanding arms 36 and 37 are provided with circular detent portions 36a and 37a respectively which are adapted to receive the head shoulder portion of the cartridge case and support it flush with the breech face 39 when in a loaded position, as seen in FIGS. 5 and 7. With this structure the spaced upstanding arms 36 and 37, being thus conditioned at the unsupported end portions 36a and 36b, especially for inherently resilient engagement and disengagement, not only engage the side walls of the cartridge case but also engage the cartridge case head shoulder portion to prohibit lateral movement of the cartridge case during extraction from the cartridge chamber. Through the supporting means thus provided by the extractor, the cartridge case will be extracted in axial alignment with the cartridge chamber 27.

One of the shortcomings inherent with previous extractors was the danger of lateral blow-out due to their construction which substantially weakened a portion of the side wall at the breech end of the tool adjacent the cartridge chamber. With the present construction there is little or no danger of lateral blow-out. As seen in FIG. 8, the side walls of the cartridge chamber 27 are only slightly weakened by the spaced slots 40 and 41 at their tangential intersection with the cartridge chamber at 27a and 27b. Any lateral blow-out which would tend to occur at these slightly weakened points 27a and 27b would be exerted at right angles to slots 40 and 41 and would be resisted by the thickness of the breech between the chamber 27 and the outer periphery of guide member 12. The prevention of lateral blow-out is even more essential in the present type tool than it is in normal firearms when it is understood that the pressure built up by the powder charge used in connection with these tools is normally five to eight times greater than those pressures which exist in a normal firearm.

Thus, through the provision of an extractor having spaced upstanding arm portions 36 and 37 which are received in relatively narrow slots 40 and 41, there is no necessity of providing additional reenforcement for the extractor in order to prevent lateral blow-out. That portion of the breech contained between the spaced slots 40 and 41 supplies sufficient reenforcing material to prevent lateral blow-out in the direction of the extractor.

An extractor actuator 49, as seen in FIGS. 6 through 12, extends through the housing 10 by means of a slot 50 and is so designed as to be resiliently urged inwardly of said slot toward the extractor 35 by means of a spring 51 which is secured to the housing by bolt 52 or any other suitable means. The extractor actuator 49 remains stationary and is not subject to longitudinal movement but is capable only of moving transversely inwardly and outwardly with respect to the guide member 12. The actuator is provided with enlarged shoulder portions 49a which are wider than the slot 50, which forms a lateral opening extending into groove 38, and provide means to limit the lateral inward movement of said extractor actuator.

The operation of the extractor is as follows. As the tool members move from the breech open position, as seen in FIG. 7, to the breech closed position, as seen in FIG. 9, the extractor remains entirely confined within the walls of the breech portion of the guide member 12. The extractor actuator 49 remains in its transversely outermost position, as seen in FIGS. 7 and 9, so that its inner end slides over the body portion 35a of the extractor, as it moves from the position of FIG. 7 to that of FIG. 9. With the tool in the breech closed position of FIG. 9, the outermost edges of the two upstanding arms 36 and 37, the breech face 39 and the head of the cartridge case are all in contact with the housing 10 so that the extractor is entirely enclosed and supported between the breech of the guide member 12 and the inner surface of the side walls of the housing 10. In FIGS. 9 and 10 the extractor actuator 49 is in its transversely outermost position with its inner edge abutting the guide member 12 about the groove 38 containing coil spring 55 which resiliently urges the extractor into a non-extracting position or into that position wherein the extractor is completely contained within the breech portion of the guide member 12, as seen in FIGS. 5 and 7. In FIGS. 9 and 10 it can be seen that the inner end of the extractor actuator 49 has a width greater than that of groove 38 so that it abuts the lower surface of the guide member 12 to be maintained in its laterally outermost position. The tool is discharged with the parts disposed as shown in FIGS. 6 and 9. As the tool is moved from the breech closed position of FIG. 9 toward the breech open position of FIG. 11, in response to the biasing action of spring 30 as the tool is withdrawn from the workpiece, the extractor actuator 49 slides along the outer surface of the guide member 12 until it reaches the transversely extending groove 43 (see FIG. 5). The transversely extending groove 43, as heretofore mentioned, provides widened shoulder portions 44 and 45 at the bottom of the groove 38 which are wider than the inner end of actuator 49; this, together with the cam surfaces 46, permits extractor actuator 49 to move laterally inwardly under the pressure of spring 51 into the transverse groove 43, to a point limited only by ear portions 49a, wherein it engages the inner end of the body portion 35a of the extractor, as best seen in FIG. 11. The actuator thus prevents the extractor from further travel with the guide member 12 in its movement toward the breech open position. As the guide member 12 continues to move from the breech closed position of FIG. 9 to the breech open position of FIGS. 5 and 7, it will be seen that the extractor, which is now held stationary, causes the cartridge to be extracted or removed from the cartridge chamber 27. This operation is shown sequentially in FIGS. 11 and 12. After the guide member 12 has moved from its position shown in FIG. 11 to that shown in FIG. 12, the entire width of the transverse groove 43 will have traveled across the inner end of extractor actuator 49 so that the extractor actuator now engages and follows the cam surfaces 47, as seen in FIG. 12, and is thereby caused to move transversely outwardly into the position seen in FIG. 12, wherein it releases the end of the extractor and permits the coil spring 55 to resiliently return the extractor to its initial closed position, as seen in FIG. 7. It will be understood that the cartridge case 17a may be removed from the extractor while it is in the position shown in FIG. 12. However, it is presently contemplated that the invention will be used with crimped cartridge casings; that is, the cartridge case adjacent its open end is crimped inwardly to retain its powder charge. The crimped end portion of the case, upon explosion of the powder, is blown open so that jagged edges are formed at its end, as seen in FIG. 12. Under these conditions, the cartridge case need not be removed when in the position of FIG. 11, for as the extractor returns to the closed position of FIG. 7, the jagged edges tend to engage the breech face 39 and thereby prevent return of the empty cartridge case into the cartridge chamber 27. The cartridge case, upon engagement of its jagged edges with the breech face 39, will readily fall out of the tool or into the open breech portion of the powder tool, where it can be easily removed by the operator.

As shown in FIGS. 11 and 12, the cartridge case is removed from the cartridge chamber in substantial axial alignment therewith. By supporting the cartridge case at two opposed points along its side walls, as well as supporting the cartridge head shoulder, there is no chance or tendency for the casing to rotate excessively out of axial alignment with the cartridge chamber 27. This provides an additional safety feature when it is considered that there is a possibility that a live cartridge may pass through the extracting operation. This would occur if the trigger were not pulled and the tool discharged, when in the position of FIG. 9. In such event, the cartridge of FIGS. 11 and 12 would be a live cartridge and there would be no jagged edges to prevent the cartridge from reentering the cartridge chamber 27. Thus, by extracting the cartridge case in axial alignment with the cartridge chamber and also by having the extractor move longitudinally or in axial alignment with the guide member 12, the tapered crimped end of the live cartridge would be returned directly into the cartridge chamber 27 instead of into the open breech portion of the tool.

Extractors heretofore constructed exerted lateral or twisting pulls upon the cartridge and caused the cartridge to pivot immediately out of axial alignment with the cartridge chamber upon extraction therefrom. This occurred because the extractor usually engaged the cartridge at only one point along its head shoulder portion so that the cartridge could not return into the cartridge chamber and therefore would be discharged into the open breech portion of the tool, where it might be accidentally exploded if the tool were actuated from a breech open position, as seen in FIG. 7, to a breech closed position, as seen in FIG. 9.

In FIGS. 13 to 17, I have shown still another embodiment of the present invention which is adapted to facilitate the extracting operation of the present invention. Here substantially all parts of the tool are identical to the embodiment of FIGS. 1 to 12 and are given identical reference characters, with the exception of the extractor 35 which is here provided with a single leaf spring 60 which is secured to the body portion 35a of the extractor by riveting, welding or in any other suitable manner and has its free end turned upwardly between the upstanding arm portions 36 and 37. The spring 60 is adapted to lie within the groove 38 between the body portion 35a of the extractor 35 and the outer surface of the guide member 12, as seen in FIGS. 13, 14. The groove 38 is provided with an additional stepped recessed portion 61, as seen in FIGS. 13, 15 and 16, which lies between the slots 38a and 38b and aids in accommodating spring 60. When the tool is in a breech open position, as seen in FIG. 13, the spring 60 is completely straight and retained between body portion 35a of the extractor and the guide member 12. However, in the breech open position after the tool has been discharged, as seen in FIG. 16, which is a position similar to FIG. 12 in the first embodiment of the invention, the spring 60 is free to return to its normal or upward position. As seen in FIG. 16, the free end of the spring engages the empty cartridge case 17a along its side wall and causes it to pivot adjacent its head shoulder portion so that the cartridge case is disposed out of axial alignment with the cartridge chamber 27. Through this novel provision the cartridge casing 17a is prevented from returning into the cartridge chamber 27 and will thereby be automatically deposited within the open breech portion of the tool. This particular embodiment of the invention is also useful with cartridges having a mouth crimped shut with a taper to make a tip, but is particularly useful with cartridge cases which do not employ crimped ends and therefore do not form jagged edges when they are exploded. In the embodiment of FIGS. 1 to 12, the extractor there shown would have a tendency to return such non-crimped cartridge case into the cartridge chamber 27 when the extractor is automatically returned to its closed position by means of the resilient coil spring 55. The spring 60 is constructed so as to engage the side wall of the cartridge case 17 and pivot it out of alignment with the cartridge chamber 27. The spring action is not so strong as to completely eject the cartridge from the gun since normally this is an undesirable occurrence in the use of this type of tool. However, the basic embodiment as shown can be made to serve as an ejector, either by lengthening the spring or with a stronger spring. The operation of the tool shown in FIGS. 13 to 17 is identical with that heretofore described with regard to the embodiment of FIGS. 1 to 12.

In view of the foregoing description, taken in conjunction with the accompanying drawings, it is believed that a clear understanding of the construction, operation and advantages of the device will be quite apparent to those skilled in this art.

What is claimed is:

1. In a powder actuated tool, a barrel member having a muzzle end and a breech end, a housing member forming a breech closure for said barrel member, said barrel member being mounted in said housing member for relative axial movement between said barrel member and said housing member in one direction to a breech closed position and in an opposite direction to a breech open position, said barrel member having a cartridge chamber for supporting a cartridge case adjacent its breech end, an extractor carried by said barrel member adjacent its breech end, means engageable with said extractor during said relative axial movement between said housing and said barrel member in said opposite direction effective to actuate said extractor and extract said cartridge case from said chamber, means on said extractor for independently supporting said cartridge case in axial alignment with said barrel following extraction therefrom, one of said barrel and housing members having a groove for connecting said extractor between said housing and barrel members for longitudinal movement relative to said barrel member during relative axial movement between said housing and barrel members, and means operatively associated with said extractor for engaging and pivoting said supported cartridge case out of said axial alignment with said barrel member after extraction therefrom.

2. In a powder actuated tool, a barrel member having a muzzle end and a breech end, a housing member forming a breech closure for said barrel member, said barrel member being mounted in said housing member for relative axial movement between said barrel member and said housing member in one direction to a breech closed position and in an opposite direction to a breech open position, said barrel member having a cartridge chamber for supporting a cartridge case adjacent its breech end, an extractor carried by said barrel member adjacent its breech end, means engageable with said extractor during said relative axial movement between said housing and said barrel member in said opposite direction effective to actuate said extractor and extract said cartridge case from said chamber, means on said extractor adapted to engage said cartridge case on at least two spaced points thereof for independently supporting said cartridge case in axial alignment with said barrel following extraction therefrom, said barrel having a groove for connecting said extractor between said housing and barrel members for longitudinal movement relative to said barrel member during relative axial movement between said housing and barrel members, and means operatively associated with said extractor for yieldably engaging and pivoting said cartridge case out of said axial alignment with said barrel member after extraction therefrom.

3. The tool of claim 2 wherein the extractor is an elongated bar shaped member offset to one side of the cartridge chamber and wherein the means for yieldably engaging and pivoting the case is a leaf spring carried on said member on the same side adjacent the barrel member biased toward said cartridge chamber.

4. In a powder actuated tool, a barrel member having a muzzle end and a breech end, a housing member forming a breach closure for said barrel member, said barrel member being mounted in said housing member for relative axial movement between said barrel member and said housing member in one direction to a breech closed position and in an opposite direction to a breech open position, said barrel member having a cartridge chamber for supporting a cartridge case adjacent its breech end, an extractor carried by said barrel member adjacent its breech end, means on said extractor adapted to engage said cartridge case in at least two spaced points thereof for independently supporting said cartridge case in axial alignment with said barrel following extraction therefrom, said means comprising a pair of spaced parallel arms, slot means in said barrel member receiving said arms whereby said arms tangentially engage opposite sides of said cartridge case, means on each of said arms engaging the rim of said cartridge case, means for actuating said extractor from an initial position to an extracting position during said relative axial movement between said housing and barrel members in said opposite direction, and means for returning said extractor to said initial position upon continued relative axial movement between said breech closure forming housing and barrel member in said opposite direction.

5. In a powder actuated tool, a barrel member having a muzzle end and a breech end, a housing member forming a breech closure for said barrel member, said barrel member being mounted in said housing member for relative axial movement between said barrel member and said housing member in one direction to a breech closed position and in an opposite direction to a breech open position, said barrel member having a cartridge chamber for supporting a cartridge case adjacent its breech end, an extractor carried by said barrel member adjacent its breech end, means on said extractor adapted to engage said cartridge case on at least two spaced points thereof for independently supporting said cartridge case in axial alignment with said barrel following extraction therefrom, said means comprising a pair of spaced parallel arms, groove means in said barrel member receiving said arms whereby said arms tangentially engage opposite sides of said cartridge case, means on each of said arms engaging the rim of said cartridge case, means operatively connected with said housing member for actuating said extractor from an initial position to an extracting position during said relative axial movement between said housing and barrel members in said opposite direction, means operatively connected with said extractor for engaging and pivoting said cartridge case out of said axial alignment with said barrel member after extraction therefrom and means operatively connected between said extractor and said barrel member for returning said extractor to said initial position upon continued relative axial movement between said breech closure forming housing and barrel member in said opposite direction.

6. In a powder actuated tool, a barrel member having a muzzle end and a breech end, a housing member forming a breech closure for said barrel member, said barrel member being mounted in said housing member for relative axial movement between said barrel member and said housing member in one direction to a breech closed position and in an opposite direction to a breech open position, said barrel member having a cartridge chamber for supporting a cartridge case adjacent its breech end, an extractor carried by said barrel member on one side adjacent its breech end, said barrel having a longitudinally extending groove in the exterior of its side wall connecting said extractor to said barrel member, said groove intersecting the breech end of said barrel, a pair of spaced slots extending inwardly of said barrel from said groove to tangentially intersect opposite sides of said cartridge chamber adjacent its outer end, said extractor having a main body portion adapted to be received within said groove so as to be movable lengthwise of said barrel, said extractor having a pair of spaced parallel arms, said arms extending away from said one side so as to be adapted to be received within said spaced slots for engagement with opposite sides of said cartridge case, means on said arms engaging the rim of said cartridge case, means operatively connecting said extractor to said housing member during said relative axial movement between said housing and barrel members in said opposite direction and causing movement of said arms relative to said barrel member effective to extract said cartridge case from said cartridge chamber and in axial alignment with said barrel member, said parallel arms of said extractor initially supporting said cartridge case in axial alignment with said barrel member after extraction therefrom, resilient means operatively connected to said extractor for finally engaging and pivoting said cartridge case out of said axial alignment with said barrel member after extraction therefrom and means operatively connected between said extractor and said barrel member for returning said extractor to said initial position upon continued relative axial movement between said breech closure forming housing and barrel member in said opposite direction.

7. In a powder actuated tool, a barrel member having displaced from each other along its axis a muzzle end and a breech end, a housing member forming a breech closure for said barrel member, said housing having a bore and lateral port adjacent said closure for loading and extraction, said barrel member being mounted in said bore of said housing member for relative axial movement between said barrel member and said housing member with fixation against rotation about said axis in one direction to a breech and lateral port closed position and in an opposite direction to a breech and lateral port open position, said barrel member having means supporting a cartridge case adjacent its breech end, an extractor carried between said housing and barrel members, said barrel member having a longitudinally extending groove substantially opposite said port in the side wall thereof and a plurality of spaced slots extending inwardly of the same from said groove toward said port to tangentially intersect said cartridge supporting means of said barrel adjacent its breech end, said extractor having a portion thereof receivable within said groove so as to be movable lengthwise of said barrel, and a plurality of spaced arm portions receivable within said spaced slots for engagement with opposite sides of said cartridge case, means operatively connecting said extractor to said housing member during said relative axial movement between said housing and barrel members in said opposite direction and causing movement of said arm portions relative to said barrel member effective to extract said cartridge case from said barrel member and in axial alignment with said barrel member, said arm portions supporting said cartridge case initially in axial alignment with said barrel member after extraction therefrom, means operatively connected to said extractor for finally engaging and pivoting said cartridge case out of said axial alignment with said barrel member after extraction therefrom and means operatively connected between said extractor and said barrel member for returning said extractor to its initial position upon continued relative axial movement between said breech closure forming housing and barrel member in said opposite direction.

8. In a powder actuated tool, a barrel member having a muzzle end and a breech end, a housing member forming a breech closure for said barrel member, said barrel member being mounted in said housing member for relative axial movement between said barrel member and said housing member in one direction to a breech closed position and in an opposite direction to a breech open position, said barrel member having a cartridge chamber for supporting a cartridge case adjacent its breech end, a cartridge extractor carried by said barrel member adjacent its breech end and operatively connected to said barrel member, said extractor having a pair of spaced arms, said barrel member having a pair of spaced slots for receiving said arms, said extractor being normally biased to place said arms completely within said slots and in engagement with opposite sides of said cartridge case, means operatively connecting said extractor to said housing member during said relative axial movement between said housing and barrel member in said opposite direction and causing movement of said pair of arms relative to said barrel member effective to project said arms out of the slots and thereby extract said cartridge case from said cartridge chamber in axial alignment with said barrel member, and said arms being adapted adjacent their ends in response to the said relative axial movement member in said opposite direction to support said cartridge case in axial alignment with said barrel member after extraction therefrom.

9. In a powder actuated tool, a barrel member having a muzzle end and a breech end, a housing member forming a breech closure for said barrel member, said barrel member being mounted in said housing member for relative axial movement between said barrel member and said housing member for axial relative movement in one direction to a breech closed position and in an opposite direction to a breech open position, said barrel member having a cartridge chamber for supporting a cartridge case adjacent its breech end, a cartridge extractor carried on one side of said barrel member in normally retracted position, said barrel having a groove slidably receiving said extractor for connecting said extractor to said barrel member, means for biasing said extractor to said retracted position whereat said extractor is fully received in said groove, said extractor having a pair of opposed means extending into said breech end between said groove and said chamber and engaging the opposite sides of said cartridge case, means operatively connecting said extractor to said housing member during a portion of said relative axial movement between said housing and barrel members in said opposite direction and causing said movement of extractor means to extract said cartridge case from said cartridge chamber in axial alignment with said barrel member, and said opposed means being adapted adjacent its case engagement in response to said portion of the relative movement in said opposite direction to support said cartridge case in substantial axial alignment with said barrel member after extraction therefrom.

10. In a powder actuated tool, a barrel member having a muzzle end and a breech end, a housing member forming a breech closure for said barrel member, said barrel member being mounted in said housing member for relative axial movement between said barrel member and said housing member in one direction to a breech closed position and in an opposite direction to a breech open position, said barrel member having a cartridge chamber for supporting a cartridge case adjacent its breech end, an extractor carried by said barrel member adjacent its breech end, said barrel having a groove connecting said extractor between said barrel member comprising a first groove extending longitudinally on one side of the side wall of said barrel, a pair of spaced parallel slots communicating with said first groove and extending inwardly of said barrel to tangentially intersect opposite sides of said cartridge chamber adjacent its outer end, said barrel member having a second groove extending transversely to and intersecting said first groove, said first and second grooves forming cam surfaces at their intersection, said extractor having a main body portion receivable within said first groove so as to be movable lengthwise of said barrel, said extractor having integral extensions each tapered to a small end and forming a pair of spaced substantially parallel arms receivable within said spaced slots snugly for engagement with opposite sides of said cartridge case at said small ends, extractor actuator means operatively connected with said housing member and responsive to said cam surfaces operatively engaging said extractor during said relative axial movement between said housing and barrel members in said opposite direction to cause said extractor to extract said cartridge case from said cartridge chamber in axial alignment with said barrel member, and said arms being adapted at said ends in response to said relative movement in said opposite direction to support said cartridge case at least ahead of the case rim in axial alignment with said barrel member after extraction thereof, and means operatively connected between said extractor and said barrel member for returning said extractor to said initial position upon continued movement of said breech closure forming housing in said opposite direction.

11. In a powder actuated fastener driving tool, a member having at one end a breech chambered for carrying a propellent cartridge case, a breech closure member, housing means with a lateral port and operatively connecting said members in axial alignment for relative axial movement in one direction approaching said end to a breech and port closing position for driving and in an opposite direction for separation of said members to a breech and port opening position thereby forming an access gap adjacent said port for cartridge case extraction and case and fastener reloading through said port, a cartridge extractor carried between said members substantially opposite said port for axial extractive movement accompanied by extractor protrusion into said gap relative to said chambered member during said opposite movement and adapted to engage said case axially at least adjacent two spaced points, resilient means biasing said extractor to retract out of said gap toward said chambered member, follower means biased for operative engagement of said closure member and extractor for accomplishing said extractive movement to fully extract said case, and cam means carried on said chambered member for lifting said follower means out of said engagement adjacent the end of said opposite and extractive movements whereby said resilient means retracts said extractor automatically out of said gap.

References Cited in the file of this patent

UNITED STATES PATENTS

| 230,224 | Beebe | July 20, 1880 |
|---|---|---|
| 2,008,362 | Littlehale | July 16, 1935 |
| 2,705,323 | Bossong | Apr. 5, 1955 |

FOREIGN PATENTS

| 6,491 | Great Britain | of 1914 |